United States Patent [19]
Takahashi

[11] Patent Number: 5,950,164
[45] Date of Patent: *Sep. 7, 1999

[54] VOICE RECORDING APPARATUS CAPABLE OF DISPLAYING REMAINING RECORDING CAPACITY OF MEMORY ACCORDING TO ENCODING BIT RATES

[75] Inventor: Hidetaka Takahashi, Musashino, Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/721,937

[22] Filed: Sep. 27, 1996

[30] Foreign Application Priority Data

| Sep. 29, 1995 | [JP] | Japan | 7-252582 |
| Dec. 26, 1995 | [JP] | Japan | 7-339430 |
| Dec. 26, 1995 | [JP] | Japan | 7-339432 |

[51] Int. Cl.⁶ .................................................. G10L 5/02

[52] U.S. Cl. ............................... 704/270; 704/229

[58] Field of Search ........................... 704/270, 201; 386/105; 348/220; 358/906; 369/127, 30

[56] References Cited

U.S. PATENT DOCUMENTS

| 4,959,735 | 9/1990 | Kawai | 358/342 |
| 5,341,456 | 8/1994 | DeJaco | 704/205 |
| 5,485,469 | 1/1996 | Suzuki | 371/41 |
| 5,490,130 | 2/1996 | Akagiri | 369/124 |
| 5,594,598 | 1/1997 | Shikakura | 360/49 |
| 5,657,420 | 8/1997 | Jacobs et al. | 704/223 |

FOREIGN PATENT DOCUMENTS

| 63-259899 | 10/1988 | Japan . |
| 1-78400 | 5/1989 | Japan . |

*Primary Examiner*—David R. Hudspeth
*Assistant Examiner*—Michael N. Opsasnick
*Attorney, Agent, or Firm*—Frishauf, Holtz, Goodman, Langer & Chick

[57] ABSTRACT

A voice recording apparatus includes an encoding unit capable of encoding an input voice signal at different encoding bit rates. A system controller records the input voice signal encoded by the encoding unit on a memory and acquires information on at least one of a used recordable capacity and remaining recordable capacity of the memory for any of the encoding bit rates. A display unit displays the information in a single way or a plurality of different ways of representation.

11 Claims, 9 Drawing Sheets

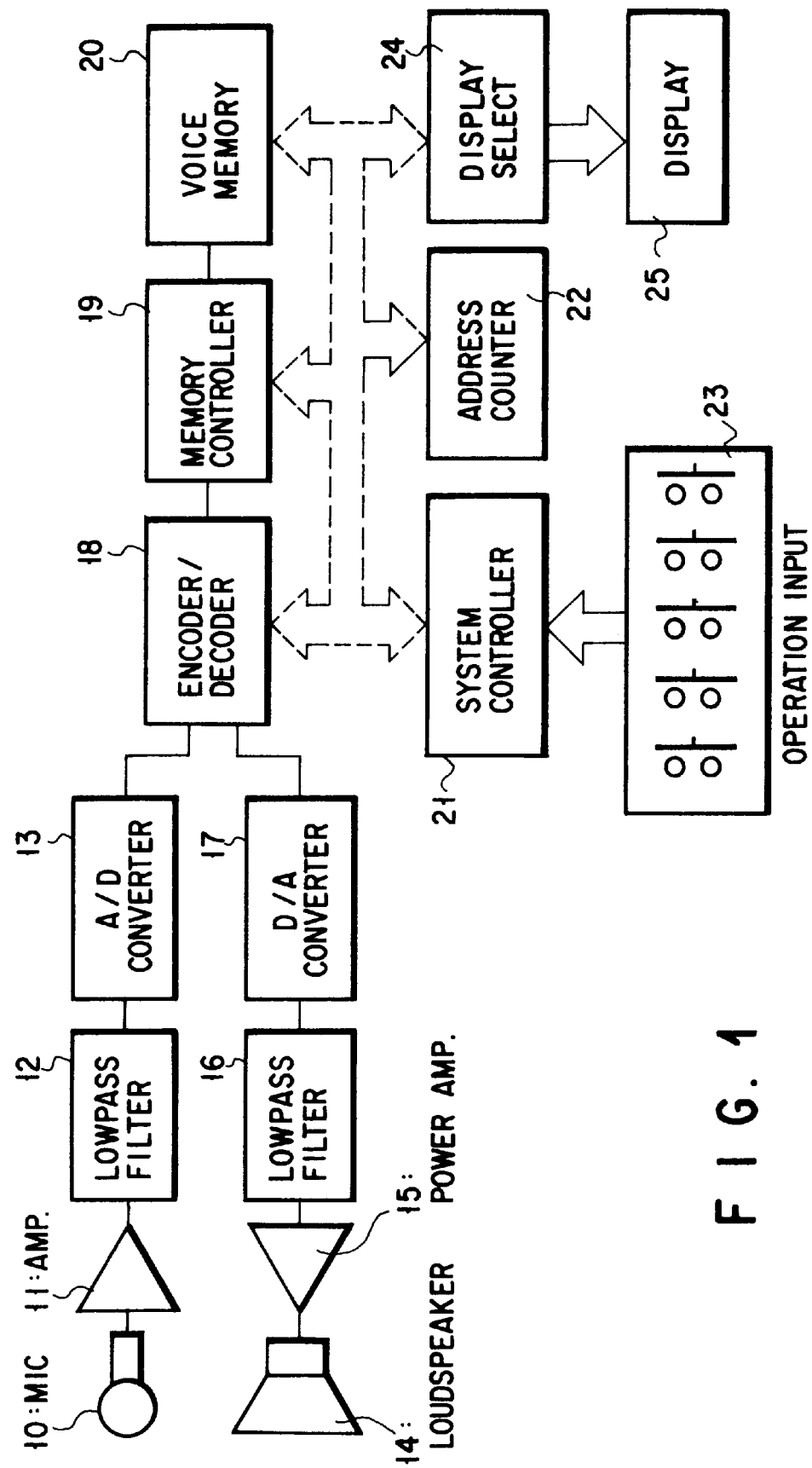
F I G. 1

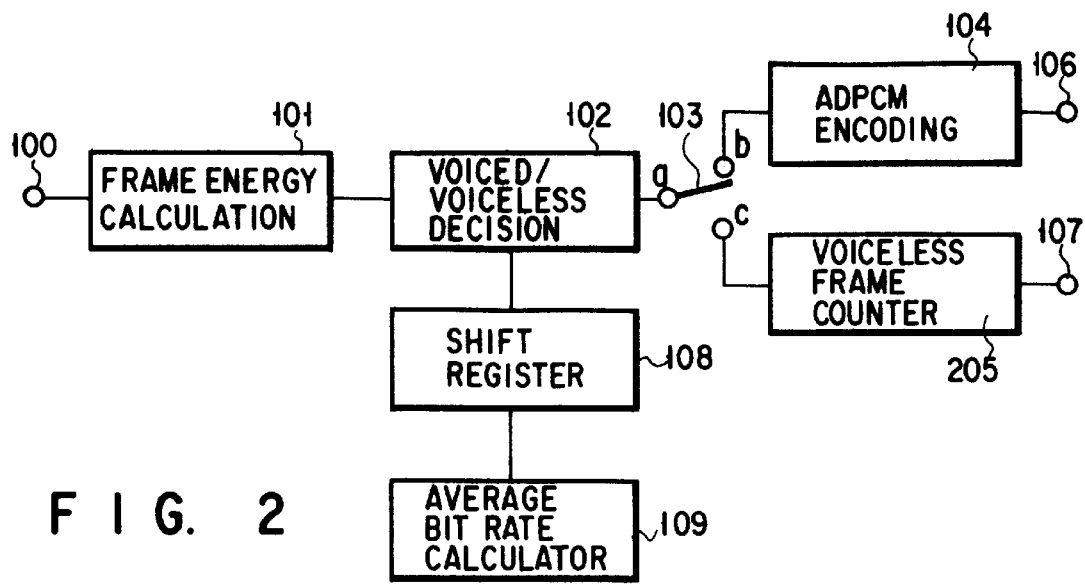
F I G. 2
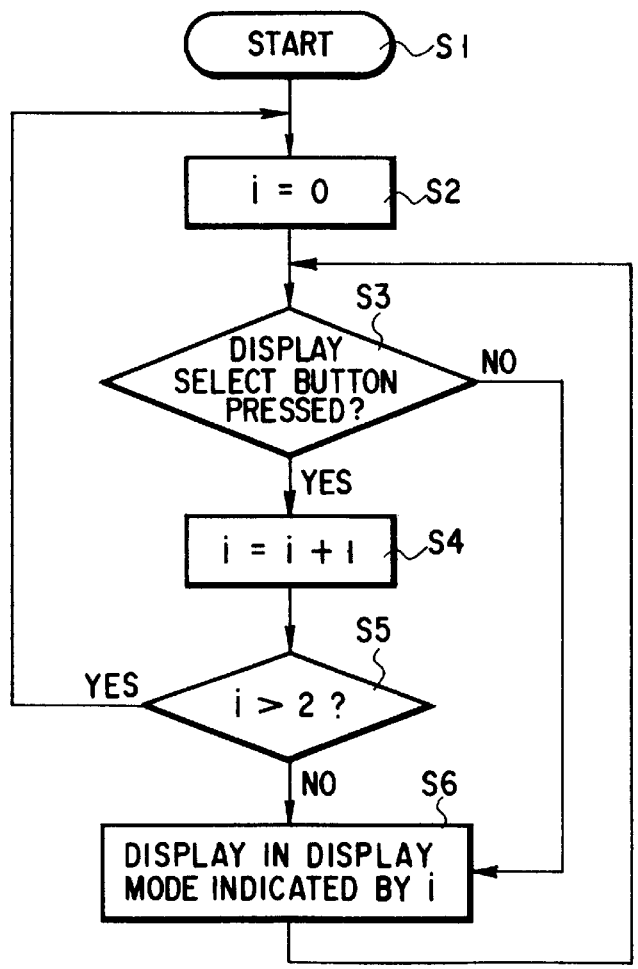
F I G. 3

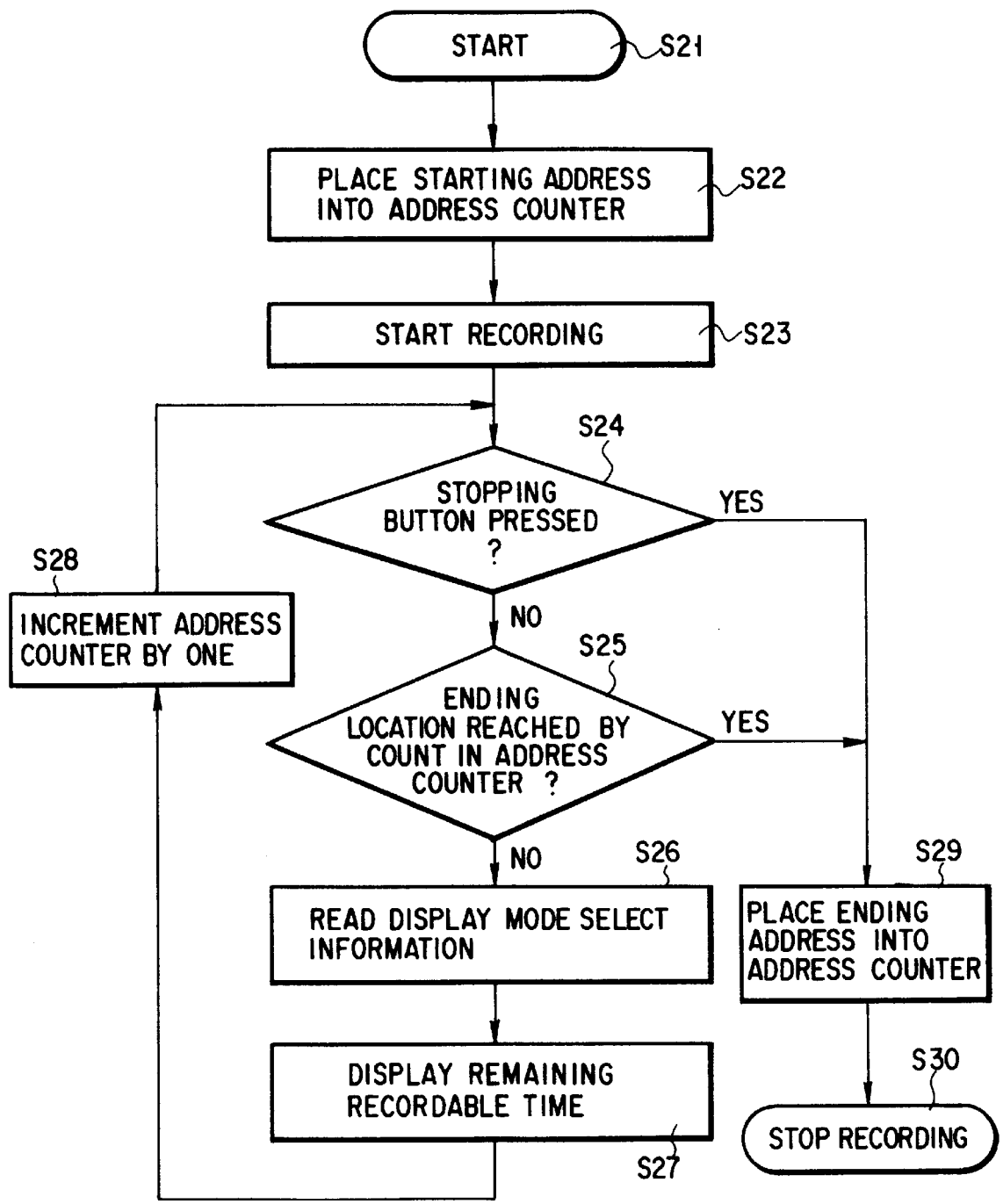
F I G. 4

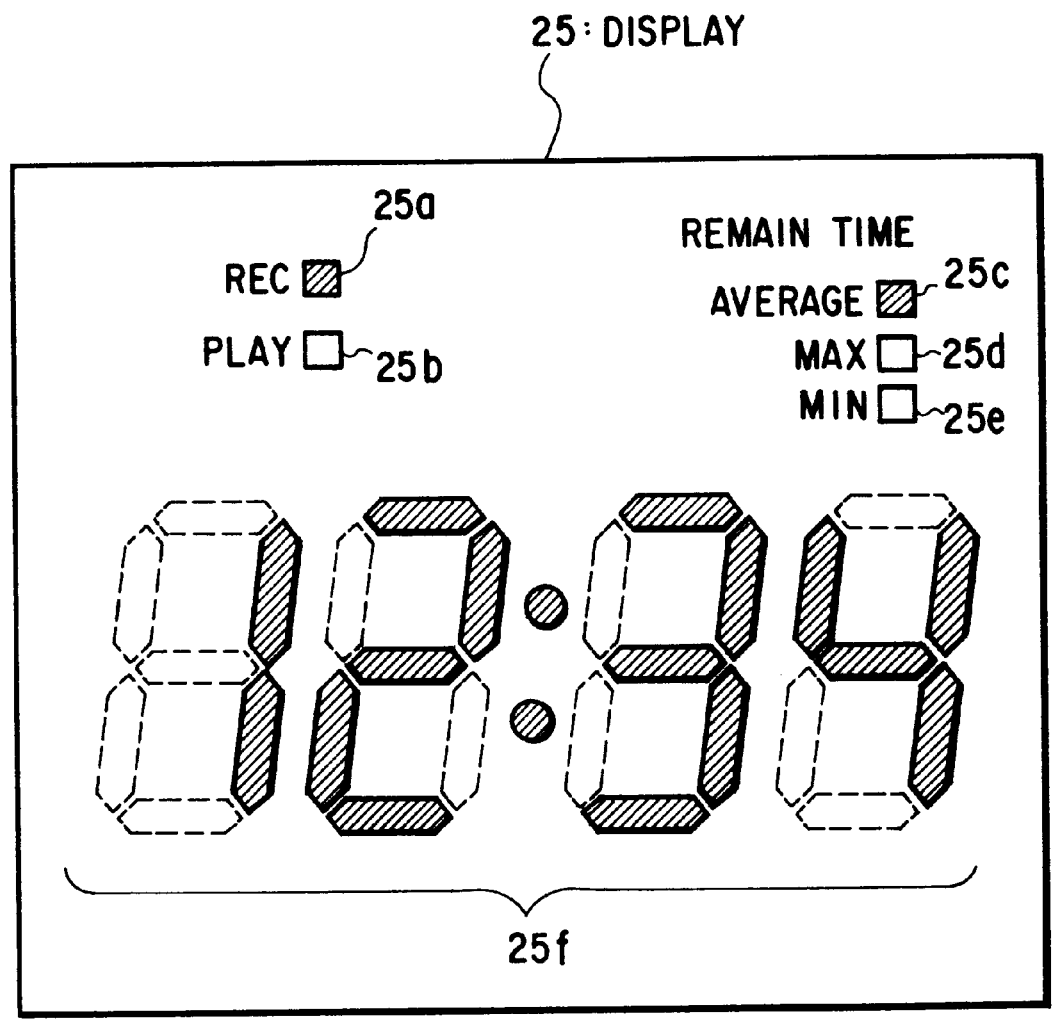
F I G. 5

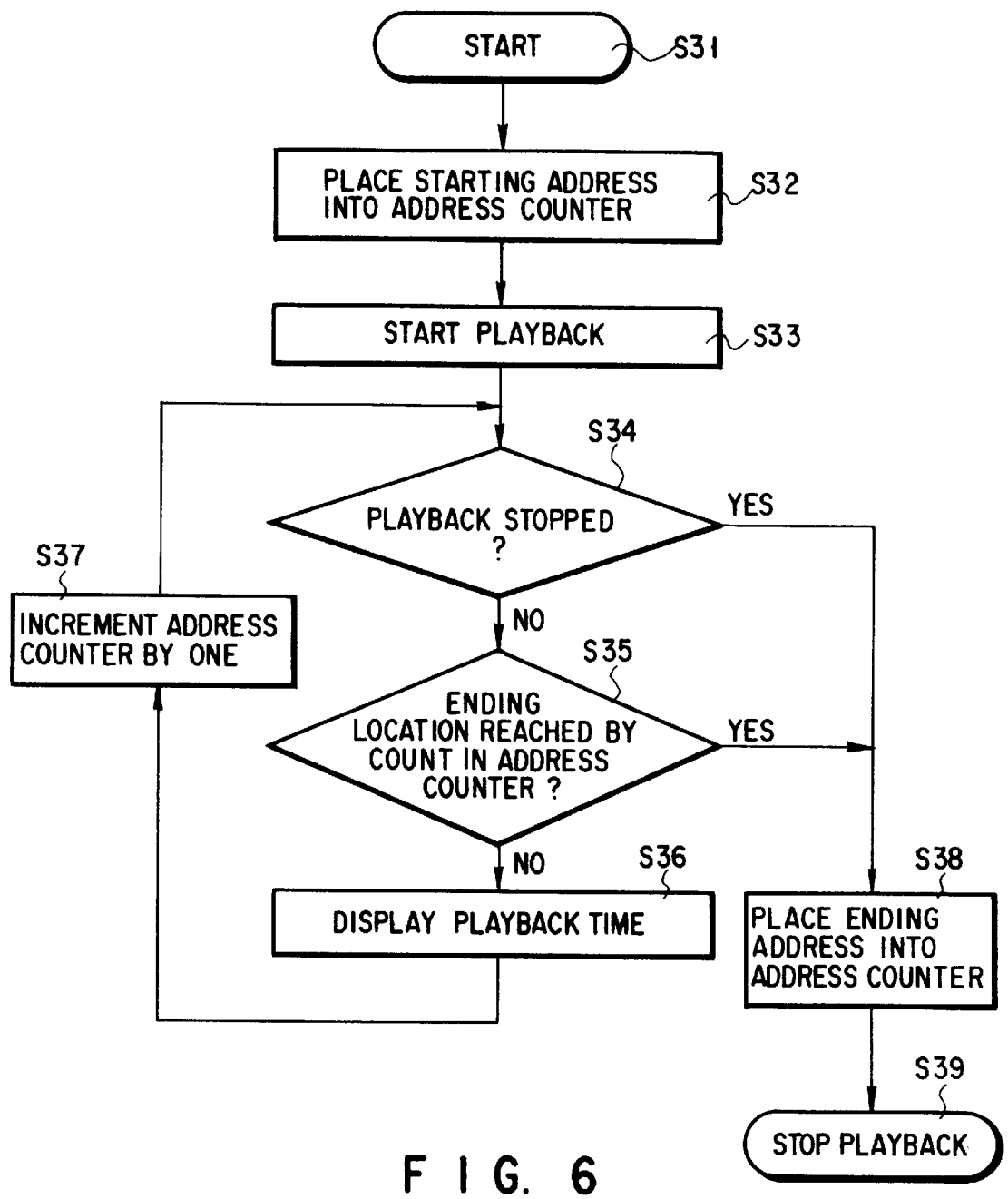
F I G. 6

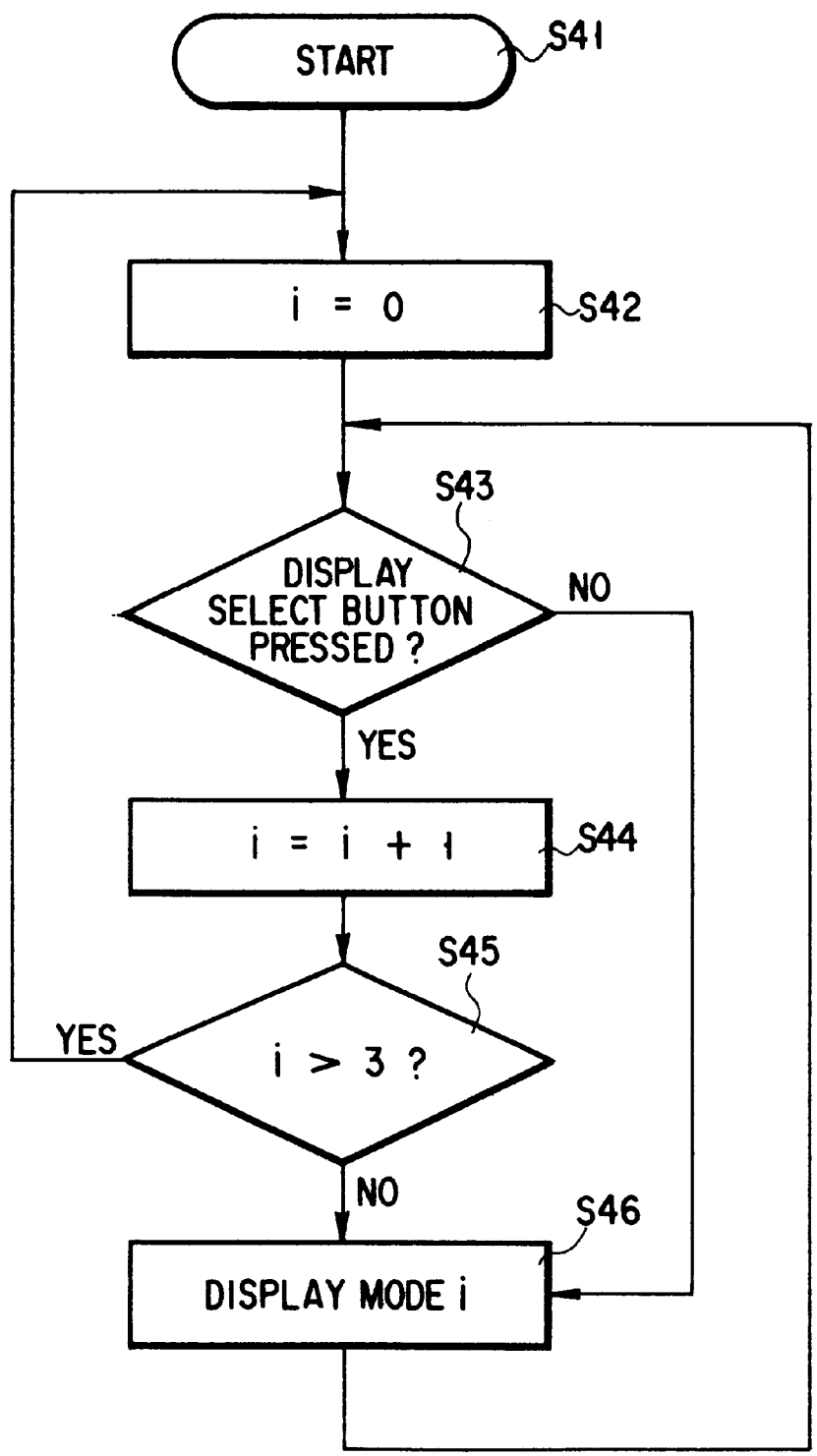
F I G. 7

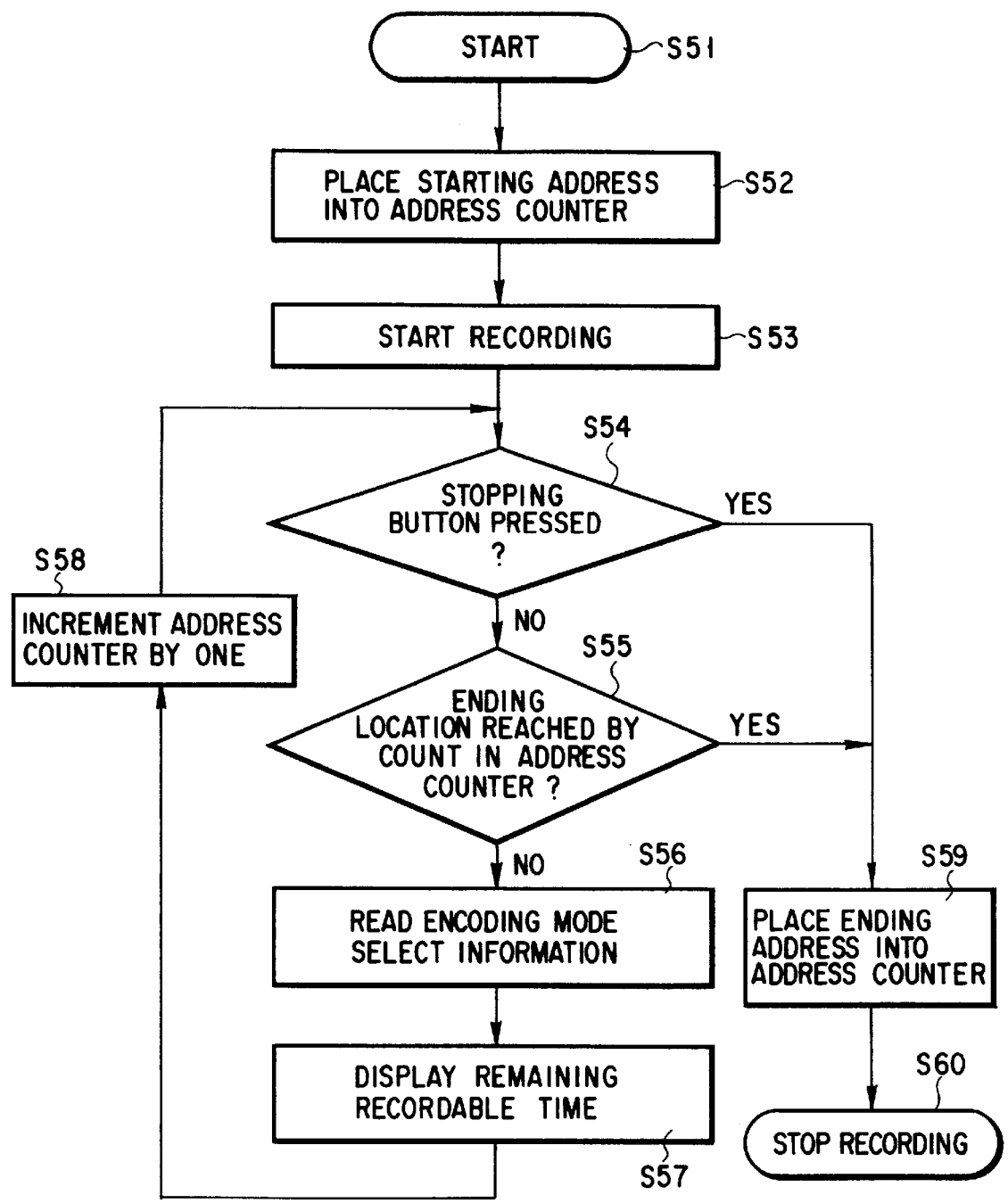
F I G. 10

VOICE RECORDING APPARATUS CAPABLE OF DISPLAYING REMAINING RECORDING CAPACITY OF MEMORY ACCORDING TO ENCODING BIT RATES

BACKGROUND OF THE INVENTION

1. Field of the Invention

The invention relates to a voice recording apparatus.

2. Description of the Related Art

Conventionally there are voice recording apparatuses of a type in which a voice signal produced by a microphone is converted to a digital signal and then stored in a semiconductor memory, and, at the time of playback, the voice signal is read from the memory and then converted to an analog signal, which, in turn, drives a loudspeaker to produce sounds.

As disclosed in Japanese Unexamined Patent Publication No. 63-259899, this type of voice recording apparatus is equipped with display means or indicating means that allows users to receive information about how much of the recording capacity of the semiconductor memory has been used or how much the recordable time is left. In addition, Japanese Unexamined Utility Model Publication No. 1-78400 discloses a voice recording apparatus which changes the mode of display when the remainder of the semiconductor memory recordable time reaches a predetermined limit.

The voice recording apparatuses of the type described above reduces the amount of data to be generated as much as possible by means of high-efficient encoding of digital voice signals, thereby reducing the amount of data to be stored in the semiconductor memory. Particularly in recent years, various voice encoding techniques have been developed with the advance of digital signal processing techniques, allowing the recordable time to be prolonged greatly.

High-efficient encoding techniques include fixedlength encoding techniques which allocate the same amount of information in a predetermined unit of time regardless of the voice state and variable-length encoding techniques which vary the amount of information to be allocated in accordance with the voice state. In the fixed-length encoding, the amount of information generated for the same sound quality generally becomes greater than in the variable-length encoding. To reduce the amount of information to a minimum, therefore, the variable-length encoding technique is used frequently.

To save the amount of data to be recorded on the semiconductor memory, the so called VAD (Voice Activity Detection) feature is used frequently, which makes a voiced/ voiceless decision to an input voice signal from a microphone, stops the recording operation when a voiceless (unvoiced) interval lasts for a predetermined period of time, and restarts the recording operation upon receipt of a voiced input.

Generally, as the encoding bit rate is set lower, the amount of data becomes smaller, so that the recordable time increases, but conversely, the sound quality deteriorates. On the other hand, the sound quality becomes better as the encoding bit rate is set higher, in which case the amount of data increases to reduce the recordable time. For this reason, a voice recording apparatus has been proposed which allows the user to make a selection among different encoding bit rates and encodes a voice signal at a bit rate which is selected.

However, the variable-length encoding technique and the VAD feature, which are effective in reducing the amount of use of the memory, have a drawback in that since the amount of information varies, the amount of use of the memory per unit time cannot become constant and the time that the voice signal can be recorded in the memory cannot be known correctly. In addition, the conventional voice recording apparatus that encodes voice signals at a bit rate selected from among multiple encoding bit rates displays the remainder of the recordable time in terms of a count in a timer circuit and hence can accommodate only one bit rate. It therefore has a drawback in that, when another bit rate is selected, the remainder of the memory recordable time cannot be displayed correctly.

SUMMARY OF THE INVENTION

It is therefore an object of the invention to provide a voice recording apparatus which permits information about the recordable capacity of a semiconductor memory to be displayed correctly and in a form which is easy to understand.

To achieve the object, a voice recording apparatus of the invention comprises: encoding means adapted to encode an input voice signal at a plurality of encoding bit rates; recording means for recording said input voice signal encoded by said encoding means onto a memory having a recordable capacity, the recordable capacity being reduced by recording by said recording means; acquisition means for acquiring information on at least one of a used recordable capacity and a remaining recordable capacity of said memory for any one of said encoding bit rates; and display means for displaying said information acquired by said acquisition means in a single way or a plurality of different ways of representation.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 shows an arrangement of a voice recording apparatus according to a first embodiment of the invention;

FIG. 2 is a block diagram of an encoding circuit equipped with a voiceless frame compression feature;

FIG. 3 is a flowchart illustrating the select operation of the display unit in the first embodiment;

FIG. 4 is a flowchart for the operation of displaying the remainder of a recordable time in the first embodiment;

FIG. 5 shows an example of displaying the remainder of a recordable time in the first embodiment;

FIG. 6 is a flowchart for the display processing at the time of playback in the first embodiment;

FIG. 7 is a flowchart illustrating the select operation of the display unit in a second embodiment of the invention;

FIG. 10 is a flowchart for the operation of displaying the remainder of a recordable time in the third embodiment.

DETAILED DESCRIPTION OF THE PREFERRED EMBODIMENTS

Figure 8:
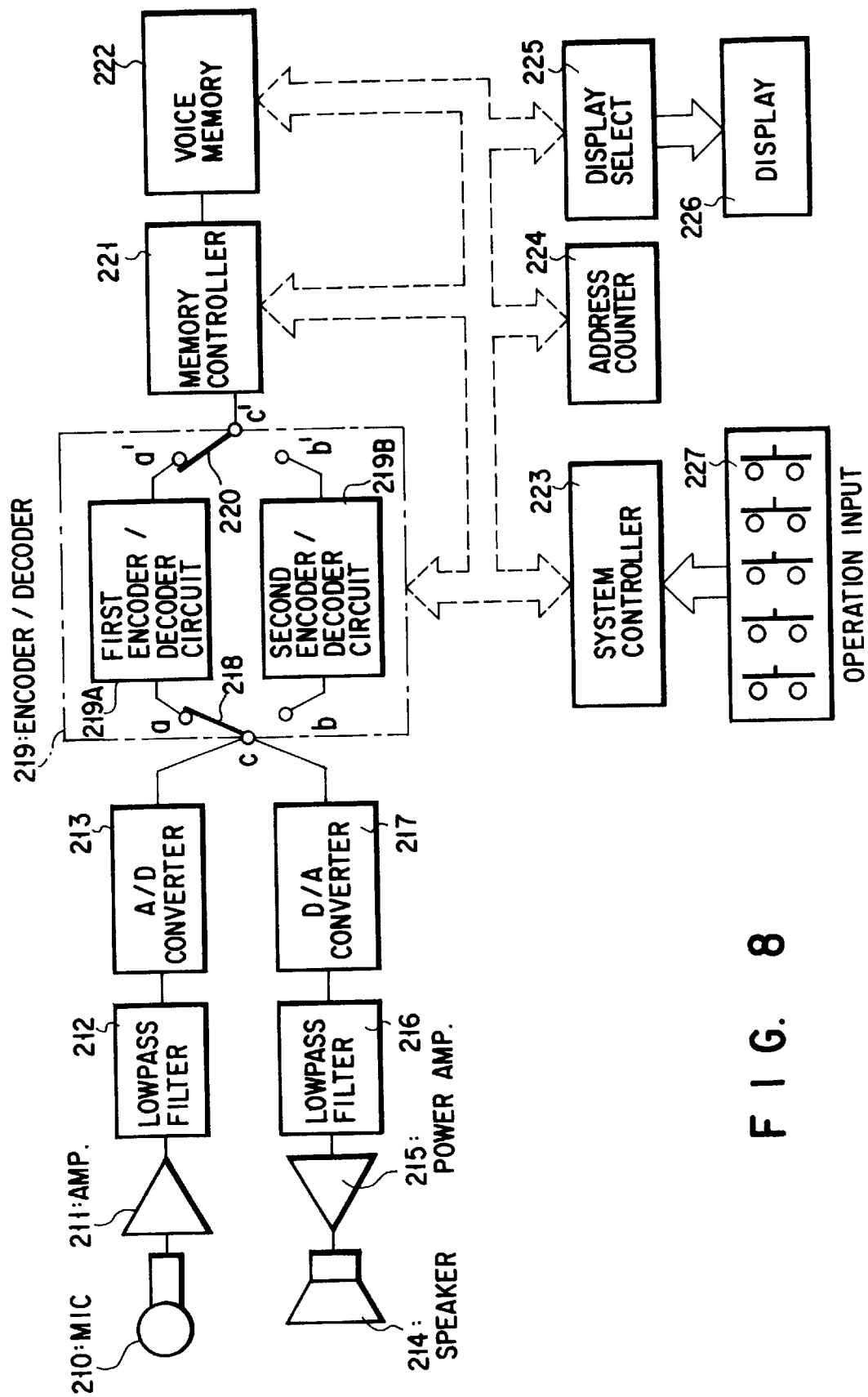
FIG. 8 shows an arrangement of a voice recording apparatus according to a third embodiment of the invention.

Referring now to FIG. 1 illustrating an arrangement of a voice recording apparatus according to a first embodiment of the invention, a microphone 10 is connected through a mic amplifier 11, a lowpass filter 12 and an analog-to-digital (A/D) converter 13 to a first terminal of an encoder/decoder unit 18 serving as encoding means. A second terminal of the encoder/decocler unit 18 is connected through a memory controller 19 to a voice memory 20. A loudspeaker 14 is connected through a power amplifier 15 and a lowpass filter 16 to a digital-to-analog (D/A) converter 17 which has its input connected to a third terminal of the encoder/decoder unit 18. The voice memory 20 comprises magnetic tape or magnetic disk, for example. The memory may be built into the voice recording apparatus or may be removably attached to the recording apparatus.

A system controller 21, serving as recording means and acquisition means, is connected to an operation input unit 23 comprised of operating buttons or switches for recording, playback, stop, display selection, etc., an address counter 22, and a display selection unit 24 as well as the encoder/decoder unit 18, the memory controller 19, and the voice memory 20. The display selection unit 24 is connected to a display unit 25 serving as display means.

FIG. 2 is a block diagram of an encoding circuit (variable-length encoding means) equipped with a voiceless frame compression feature in the encoder/decoder unit 18 shown in FIG. 1.

In FIG. 2, a frame energy calculator 101 has its input connected to an input terminal 100 and its output connected to a voiced/voiceless decision unit 102 which makes a decision of whether an input signal is a voiced signal or a voiceless signal. The output of the decision unit 102 is connected to an input terminal a of a changeover switch 103 which has its output terminal b connected to an ADPCM (Adaptive Differential Pulse Code Modulation) encoder 104 which performs digital processing by means of a method called adaptive differential code modulation and its output terminal c connected to a voiceless-frame counter 105. An output terminal 106 of the ADPCM encoder 104 and an output terminal 107 of the voiceless-frame counter are both connected to the memory controller 19 of FIG. 1. The voiced/voiceless decision unit 102 is connected through a shift register 108 to an average bit rate calculator 109. Note here that, in this embodiment, the term "voiced signal" means signals corresponding to words spoken by a speaker and the term "voiceless signal" means signals corresponding to any other sound or no sound.

In the above-described arrangement, when an operator performs a recording operation through the operation input unit 23 of FIG. 1, an analog voice signal input from the microphone 10 is amplified by the amplifier 11 and then sent to the lowpass filter 12 where unwanted high-frequency components are removed. An output signal of the lowpass filter 12 is converted to a digital signal in the A/D converter 13. At this point, the system controller 21 allows the encoding circuit in the encoder/decoder unit 18 to encode the digital signal from the A/D converter 13. The resulting coded data is then fed through the memory controller 19 into the voice memory 20.

When the operator performs an playback operation through the operation input unit 23, the coded data is read out of the voice memory 20 and then sent to the encoder/decoder unit 18. At this point, the system controller 21 allows the decoding circuit to decode the coded data. The resulting decoded data is then converted to an analog signal in the D/A converter 17. The analog signal is fed to the lowpass filter 16 where, of frequency components included in the analog signal from the D/A converter, unwanted high-frequency components are removed. The analog signal output from the lowpass filter 16 is amplified by the power amplifier 15 to thereby drive the loudspeaker 14.

During the operation described above, the memory controller 19 controls the transfer of signals between the voice memory 20 and the encoder/decoder unit 18.

The address counter 22 performs a count operation in accordance with address data supplied from the system controller 21 to thereby address the voice memory 20.

Next, a description will be given of the encoding operation by the encoding circuit in the encoder/decoder unit 18. When the operator performs a playback operation through the operation input unit 23, a digital signal sampled at a sampling frequency of, for example, 8 kHz in the A/D converter 13 is input to the input terminal 100 in FIG. 2. The digital signal is divided into predetermined frame periods (for example, the frame period is set to 20 ms, which corresponds to 160 samples) and then the frame energy E (dB) is sought by the frame energy calculator 101 as follows:

$$E = 10 \cdot \log_{10}\left(1 + \sum_{n=0}^{N-1} s^2(n)\right) \quad (1)$$

where N represents the length of each frame (i.e., 160 samples) and s(n) represents an n-th sample.

The frame energy E sought by expression (1) is compared with a threshold previously set in the voiced/voiceless decision unit 102. When the frame energy E is greater than the threshold, it is decided that a voice is contained in that frame; otherwise, it is decided that the frame includes voiced sound. In the presence of a voiced sound, the voiced/voiceless decision unit 102 is connected by the changeover switch 103 to the ADPCM encoder unit 104 where the digital signal is subjected to ADPCM encoding. In the case where the frame includes voiceless sound, the voiced/voiceless decision unit 102 is connected by the changeover switch 103 to the voiceless-frame counter 107 where the number of successive voiceless frames is counted, then coded.

That is, with each frame (20 ms, 160 samples) coded data and voiced/voiceless decision data are stored into the voice memory 20 under the control of the memory controller 19. For example, suppose that the voiced/voiceless decision data uses one bit for each frame. Suppose that the ADPCM coding is performed at 16 kbits/s and the number of successive voiceless frames is coded at 2 kbits/s in the voiceless-frame counter 105. Then, each frame of voiced sound will consume 1 bit+320 bits of data, and successive voiceless frames will consume 1 bit+40 bits of data.

In this way, the voiceless frames are counted and only its count is output, which helps further save the amount of the memory.

Hereinafter, the average bit rate calculating method used in the average bit rate calculator 109 will be described.

For example, suppose that, in FIG. 2, the ADPCM coding is performed at 16 kbits/s for each voiced frame in the ADPCM coding unit 104 and the number of voiceless frames is coded at 2 k-bits/s in the voiceless-frame counter 107.

It is generally said that, in normal speech, the percentage (proportion) taken up by the voiced state is in the range of 60 to 70%, while the voiceless state percentage is in the range of 30 to 40%. It is assumed here that the voiced state percentage is 60%, while the voiceless state percentage is 40%. Under this condition, the average bit rate is represented by $$16 \times 0.6 + 2 \times 0.4 = 10.4 [\text{kbits/s}]$$

Alternatively, the actual average bit rate within a predetermined interval of time prior to a certain point of time at which recording is being made may be sought as follows. That is, at the start of recording, the average bit rate is calculated in accordance with the above expression. As the recording proceeds, the results of decisions made by the voiced/voiceless decision unit 102 of FIG. 2 for a predetermined number of frames (e.g., 500 frames) are stored in the shift register 108. The average bit rate calculator 109 calculates the numbers of voiced and voiceless frames in the predetermined number of frames and then calculates the average bit rate on the basis of the numbers of the voiced and voiceless frames. For example, assuming that, of past 500 frames, the number of voiced frames is 275 and the number of voiceless frames is 225, the average bit rate will be calculated to be $$16 \times 275/500 + 2 \times 225/500 = 9.7 [\text{kbits/s}]$$

The decoding operation will be described next.

When the operator performs a playback operation through the operation input unit 23, the voiced/voiceless decision data of one bit for the starting frame is first read out of the voice memory 20 and then read by the system controller 21. If the starting frame is a voiced frame, the memory controller 19 reads 320-bit data from the voice memory 20 and supplies it to the encoder/decoder unit 18, so that the data is subjected to ADPCM decoding. If, on the other hand, the starting frame is a voiceless frame, the memory controller 19 reads 40-bit data from the voice memory 20 and supplies it to the encoder/decoder unit 18, which produces a random signal according to the number of successive voiceless frames indicated by that data.

The timing of encoding, decoding, and the like is controlled by the system controller 21 in response to a signal sent from the operation input unit 23. The recording locations are determined by addressing the voice memory 20 on the basis of the count operation of the address counter 22.

Hereinafter, the operation of the display selection unit 24 and the display unit 25 at the time of recording will be described.

A recording operation is continued until the recordable capacity of the voice memory 20 is exhausted or until the operator performs a stopping operation through the operation input unit 23. During such a recording operation, the system controller 21 calculates the amount of use of the voice memory and allows the display unit 25 to display the remainder of the recordable time of the voice memory.

In this embodiment, the display unit 25 is arranged to display the remainder of the recordable time in the following three modes in accordance with display mode select information input by the operator and calculations performed by the system controller 21.

Display mode 0: the remainder of the recordable time based on the average encoding bit rate (a first calculation).

Display mode 1: the remainder of the recordable time based on the maximum encoding bit rate that the variable-length encoding means can take (a second calculation).

Display mode 2: the remainder of the recordable time based on the minimum encoding bit rate that the variable-length encoding means can take (a third calculation).

Next, reference will be made to a flowchart of FIG. 3 to describe the operation of selecting among the three display modes.

When, in step S1, the operator presses the recording button in the operation input unit 23 to thereby start recording, an internal display mode counter i is reset to zero (step S2). In subsequent step S3, a decision is made as to whether or not the display select button, serving as second select means, in the operation input unit 23 has been pressed. If the decision is that the select button has been pressed, the display mode counter i is incremented by one in step S4 and then a decision is made in step S4 as to whether or not i is greater than two. If i is not greater than two, then the procedure goes to step S6 in which a display is made in the display mode indicated by i. After that, the procedure returns to step S3. If, in step S5, the decision is that i is greater than two, then the procedure goes to step S2 to reset i to zero. If, in step S3, the decision is that the select button is not pressed, then the procedure goes to step S6 to make a display in the display mode indicated by i.

That is, as long as the operator does not press the display select button after the recording operation has been started, in which case the result of the decision in step S3 is NO, the remainder of the recordable time is displayed in the display unit 25 in the display mode 0, i.e., on the basis of the average encoding bit rate. When the operator next presses the display select button for the first time, i is incremented to one in step S4 and the result of the decision in step S5 is NO. Thus, the remainder of the recordable time is displayed in the display mode 1 (i=1), i.e., on the basis of the maximum encoding bit rate that the variable-length encoding means can take. When the operator next presses the display select button a second time, i is incremented to two in step S4. At this point, the result of the decision in step S5 is still NO. Thus, the remainder of the recordable time is displayed in the display mode 2 (i=2), i.e., on the basis of the minimum encoding bit rate that the variable-length encoding means can take.

Although, in this embodiment, one of the display modes 0, 1 and 2 is implemented by pressing the display select button, display mode 3 may be added to implement the display modes 0, 1 and 2 simultaneously. That is, in this case, displays of the remainder of the recordable time based on the average bit rate, the maximum bit rate, and the minimum bit rate are made simultaneously. In this case, it is necessary only that the decision content in step S5 be changed from i>2 to i>3. Further, display modes may include only the display modes 0 and 1 or the display modes 0 and 2. in this case, switching between the two display modes is made by the display select button.

In the embodiment described above, a single display select button is used to switch among the display modes 0, 1 and 2. Alternatively, provision may be made of a plurality of display select buttons each of which corresponds to a respective one of display modes. Moreover, instead of the operator pressing a display select button, the display modes 0, 1 and 2 may be automatically switched at regular intervals.

Furthermore, it is also possible to set the display unit to make only the display based on the average encoding bit rate or only simultaneous display. In this case, the display select button need not be used.

As described above, according to the first embodiment, the remainder of the recordable time corresponding to each encoding bit rate can be displayed simultaneously or selectively.

Further, instead of displaying the remainder of the recordable time corresponding to the remaining memory capacity, the time spent in recording corresponding to the used memory capacity may be displayed. Alternatively, these two pieces of information may be displayed simultaneously.

Hereinafter, the operation of displaying the remainder of the recordable time will be described with reference to a flowchart of FIG. 4.

First, step S21 indicates the state where the apparatus is waiting for the next operation after the power-on operation, the stopping operation, or the like. In next step S22, the system controller 21 places a starting address into the address counter 22 on the basis of the usage of the voice memory 20. The user next presses the recording button in the operation input unit 23 to thereby start a recording operation (step S23). In subsequent step S24, a decision is made as to whether or not the user has pressed the stopping button in the operation input unit 23 during the recording operation. If the decision is that the stopping button has not been pressed, then a decision is made in step S25 as to whether or not the count in the address counter 22 indicates the ending location in the voice memory 20. If the result of the decision is NO, then display select information from the operation input unit 23 is read (step S26). Further, the remainder of the recordable time is calculated on the basis of the count in the address counter 22 (i.e., the remaining capacity of the voice memory 20) and the selected display mode (the average bit rate in display mode 0, the maximum bit rate in display mode 1, or the minimum bit rate in display mode 2) and in accordance with the above-described method and then displayed on the display unit 25 (step S27).

FIG. 5 shows an example of such a display. When the apparatus is in record mode and display mode 0 is selected, a REC indicator 25a is lit and an Average indicator 25c is lit. In this example, 12 minutes 34 seconds is displayed on a time display section 25f as the remainder of the recordable time (Remain Time). When display mode 1 is selected, a Max indicator 25d is lit, while, when display mode 2 is selected, a Min indicator 25e is lit.

The address counter is next incremented by one (step S28) and then step S24 is carried out again. In this manner, the recording operation is continued while the address counter 22 is incremented one by one until a recording stopping operation is performed or the address indicating the ending location in the voice memory 20 is reached.

On the other hand, when the result of the decision in step S24 or S25 is YES, the ending address is placed into the address counter 22 (step S29) and then the recording operation is stopped (step S30).

The calculation of the remainder of the recordable time in step S27 is performed by the following expression $$t = \frac{Mem \times \alpha}{Rate} \ [s] \quad (2)$$

where Mem represents the entire capacity of the voice memory in terms of bits, Rate represents the bit rate for the selected display mode in terms of bits/s, and α represents the ratio of the number of the remaining addresses to the address indicating the ending location in the voice memory 20.

In this case, α is calculated by $$\alpha = \frac{ce - c}{ce} \quad (3)$$

where c represents the count in the address counter and ce represents the address indicating the ending location in the voice memory.

If, the remaining recordable time is displayed on the basis of the average encoding bit rate, the difference from the actual recordable time can be made small to display the remaining recordable time more correctly. In using the average encoding bit rate, there arises the possibility that actual recording cannot be made so long as the displayed time. If this causes inconvenience, it is preferable that the display mode be switched so that the remaining recordable time based on the maximum encoding bit rate will be displayed.

According to the first embodiment described above, the remaining recordable time for the voice memory 20 can be displayed more correctly. In addition, the user can optionally switch among the display modes, which permits a display more convenient to he or she to be made.

Next, the display operation at the time of playback will be described.

The playback operation is continued until the count in the address counter 22 reaches the ending address or the operator performs a stopping operation through the operation input unit 23. During the playback operation, the system controller 21 calculates the playback time on the basis of the count in the address counter 22 and causes the display unit 25 to display it.

Hereinafter, the display processing at the time of playback will be described with reference to a flowchart of FIG. 6.

First, step S31 indicates the state where the apparatus is waiting for the next operation after the power-on operation, the stopping operation, or the like. In next step S32, the system controller 21 places a starting address into the address counter 22. When the user next presses the playback button in the operation input unit 23, a recording operation is started from a frame corresponding to the starting address (step S33). In subsequent step S34, a decision is made as to whether or not the user has pressed the stopping button in the operation input unit 23 during the playback operation. If the decision is that the stopping button has not been pressed, then a decision is made in step S35 as to whether or not the count in the address counter 22 indicates the ending location in the voice memory 20. If the result of the decision is NO, the playback time is calculated, then displayed (step S36).

In this case, in FIG. 5, a PLAY indicator 25b is lit, but the other indicators 25c, 25d and 25e are not lit. The time (12 minutes 34 seconds in the example of FIG. 5) displayed on the time display section 25f will indicate the remainder of the playback time.

Returning to the flowchart of FIG. 6, if the result of the decision in step S34 or S35 is NO, then the ending address is placed into the address counter 22 (step S38) and the playback operation is stopped (step S39).

Thus, in this embodiment, one-frame data is played back for voiced sound, while one-frame data of 20 ms is played back the number of successive frame times for voiceless sound.

The address counter 22 is next incremented by one (step S37) and then step S34 is carried out again. And the playback operation is continued while the address counter is incremented one by one until a playback stopping operation is performed by the user or the count in the address counter 22 reaches the ending address.

Although, in this embodiment, the displayed playback time is calculated from the number of frames played back, this is merely exemplary. The playback time may be calculated in the system controller 21 from the count of system clock pulses produced after the start of playback and the period of the system clock pulses.

Next, a second embodiment of the invention will be described. The arrangement of the second embodiment is substantially the same as that of the first embodiment and hence its description will not be needed here. In recording encoded input signals on the memory, the second embodiment displays the consumed state of the memory in several ways of representation in accordance with the display contents selected in the display select unit.

That is, the display unit 25 in the second embodiment is arranged to optionally make the following four types of displays as specified by the operator.

Display mode 0: the recording time (the current length of time spent in recording on the memory).

Display mode 1: the remaining amount of time (the remaining recordable time of the memory).

Display mode 2: the percentage of the used capacity of the memory (the ratio of the current used capacity to the overall available capacity of the memory).

Display mode 3: the percentage of the unused capacity of the memory (the ratio of the remaining available capacity to the overall available capacity of the memory).

In display mode 0, the time that elapsed after the start of recording is displayed on the display unit 25.

In display mode 1, the remaining amount of time is calculated by the system controller 21 from the ending address indicating the ending location in the voice memory 20, the count in the address counter 22 indicating the current location in the memory, and the encoding bit rate and the result is displayed on the display unit 25.

In display mode 2, the percentage of the used capacity of the memory is calculated by the system controller 21 from the ending address indicating the ending location in the voice memory 20 and the count in the address counter 22 indicating the current location in the memory and the result is displayed on the display unit 25.

In display mode 3, the percentage of the current remaining capacity of the memory 20 is calculated by the system controller 21 from the ending address indicating the ending location in the memory and the count in the address counter 22 indicating the current location in the memory and the result is displayed on the display unit 25.

Hereinafter, the display mode select processing will be described with reference to a flowchart of FIG. 7.

When, in step S41, the operator presses the recording button in the operation input unit 23 to thereby start recording, the system controller 21 resets to zero the display mode counter i built into the display select unit 24 (step S42). In subsequent step S43, a decision is made as to whether or not the display select button, serving as a first select means, in the operation input unit 23 has been pressed. If the decision is that the select button has been pressed, then i is incremented by one in step S44 and then a decision is made in step S45 as to whether or not i is greater than three. If i is not greater than three, the display unit enters the display mode corresponding to i (step S46). If the result of the decision in step S43 is NO, the procedure goes to step S46 in which a display is made in the display mode i indicates.

In this manner, the user is allowed to switch the display modes; by pressing a single display select button. The operation input unit may be arranged to include a plurality of display select buttons which are made to correspond one for one with display modes.

The display modes described above have merits and demerits. It is therefore desirable that one of the display modes be selected according to conditions to make use of its merit.

For example, the display mode 2 or 3 should be selected when variable-length encoding is used because the bit rate is indeterminate and consequently the remaining time cannot be displayed correctly. In the display modes 2 or 3, information on the memory capacity can be displayed correctly. However, unlike time display, the capacity display is not familiar to users. It is therefore difficult for users to know how the remaining memory capacity corresponds with the amount of time. When fixed-length encoding in which the encoding bit rate is constant is used, therefore, it is preferable that the display mode 1 be selected to display the remaining amount of time.

Thus, according to the second embodiment of the voice recording apparatus of the invention, the user can optionally switch the display modes, permitting displays easy for him or her to understand to be made.

In the second embodiment, a selection can be made from the display modes 0 and 1 in which time display is made even when variable-length encoding is used in voice recording. When the variable-length encoding is used, the system controller 21 may control the display select unit 24 so as to prohibit the time display from being selected.

In this case, the initial value of the parameter i in step S42 of the flowchart of FIG. 7 is merely changed from zero to two.

Thus, according to the second embodiment of the invention, displays that are highly reliable and easy to understand can be made.

Next, a third embodiment of the invention will be described.

FIG. 8 is a block diagram of a voice recording apparatus according to the third embodiment. The arrangement of the third embodiment is the same as that of the first embodiment except for an encoder/decoder unit. Only the distinct portion will be described here.

That is, an encoder/decoder unit 219 is constructed from a first switch 218 switchable between contacts a and b with contact c used as the movable member, a second switch 220 switchable between contacts a' and b' with contact c' used as the movable member, a first encoder/decoder circuit 219A, and a second encoder/decoder circuit 219B. The first encoder/decoder circuit 219A encodes/decodes voice signals at a bit rate of, for example, 32 Kbits/s, while the second encoder/decoder circuit 219B encodes/decodes voice signals at a bit rate of, for example, 16 kbits/s in accordance with ADPCM (Adaptive Differential Pulse Code Modulation). The first and second encoder/decoder circuits 219A and 219B serve as multiple encoding means with different encoding bit rates.

When, in the above arrangement, the operator performs a recording operation through an operation input unit 227, an analog voice signal entered from a microphone 210 is amplified by a mic amplifier 211, then filtered by a lowpass filter 212 to remove unwanted high-frequency components. An output signal of the lowpass filter 212 is converted to a digital form by an A/D converter 213.

At this point, a system controller 223 responds to encoding mode select information obtained from the operation input unit 227 when the operator presses an encoding mode select button as second select means to operate the first switch 218 to select either of the first and second encoding/decoding circuits 219A and 219B in the encoder/decoder unit 219. The digital signal from the A/D converter 213 is encoded in the selected encoder/decoder circuit. The encoded data is stored into a voice memory 222 via a memory controller 221.

Figure 9:
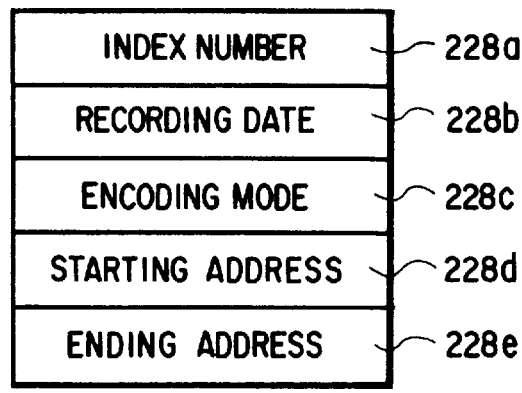
FIG. 9 shows an arrangement of index data.

During the sequence of operations, the memory controller 221 controls the transfer of signals between the voice memory 222 and the encoder/decoder unit 219. The voice memory 222 stores index data in addition to encoded data from the memory controller 221. As shown in FIG. 9, for example, the index data includes index number 228a, recording date 228b, encoding mode 228c, starting address 228d, and ending address 228e.

When the operator performs a playback operation through the operation input unit 227, encoded data and index data are read from the voice memory 222. In response to the encoding mode 228c included in the index data the second switch 220 operates to select either of the first and second encoding/decoding circuits 219A and 219B. Encoded data supplied to the encoding/decoding unit 219 via the memory controller 221 is decoded in the selected encoding/decoding circuit to produce decoded data. Being a digital signal, the encoded data is converted to an analog signal in a D/A converter 217. The analog signal from the D/A converter is applied to a lowpass filter 218 where unwanted frequency components are removed. The analog signal output from the lowpass filter is amplified by a power amplifier 215 to drive a loudspeaker 214.

The timing of recording or playback is controlled by the system controller 223 in response to a signal from the operation input unit 227. Recording locations in the voice memory 222 are determined by addressing the voice memory. The addresses in the voice memory are determined by an address counter 224.

Hereinafter, the operations of a display unit 226 and a display select unit 225 at the time of recording in the third embodiment will be described.

A recording operation is continued until the recordable capacity of the voice memory 222 is exhausted or a stopping operation is performed by the operator through the operation input unit 227. During the recording operation, the system controller 223 evaluates the usage of the capacity of the voice memory 222 and displays it on the display unit 226.

The operation of displaying the remaining recordable time according to encoding mode select information will be described with reference to a flowchart of FIG. 10.

First, in step S51, the system controller 223 is waiting for the next operation after power-on or stopping operation. In subsequent step S52, the system controller places a starting address into the address counter 224 according to the usage of the voice memory 222. When the recording button is next pressed by the user, a recording operation is started (step S53). A decision is next made in step S54 as to whether or riot the user has pressed the stopping button during the recording operation. If the decision is that the stopping button has not been pressed, then a decision is made in step S55 as to whether or not the count in the address counter 224 indicates the ending location in the voice memory 222. If the result of the decision is NO, the used capacity or the remaining capacity of the memory is displayed conjointly with an encoding means selecting operation. That is, encoding mode select information from the operation input unit 227 is read (step S56). The remainder of the recordable time (the remaining capacity of the memory) is calculated from the count in the address counter 224 and the read encoding mode select information (it is assumed here that the first encoding/decoding circuit 219A is selected), then displayed on the display unit 226 in a display form selected in the display select unit 225 (step S57).

Figure 11:
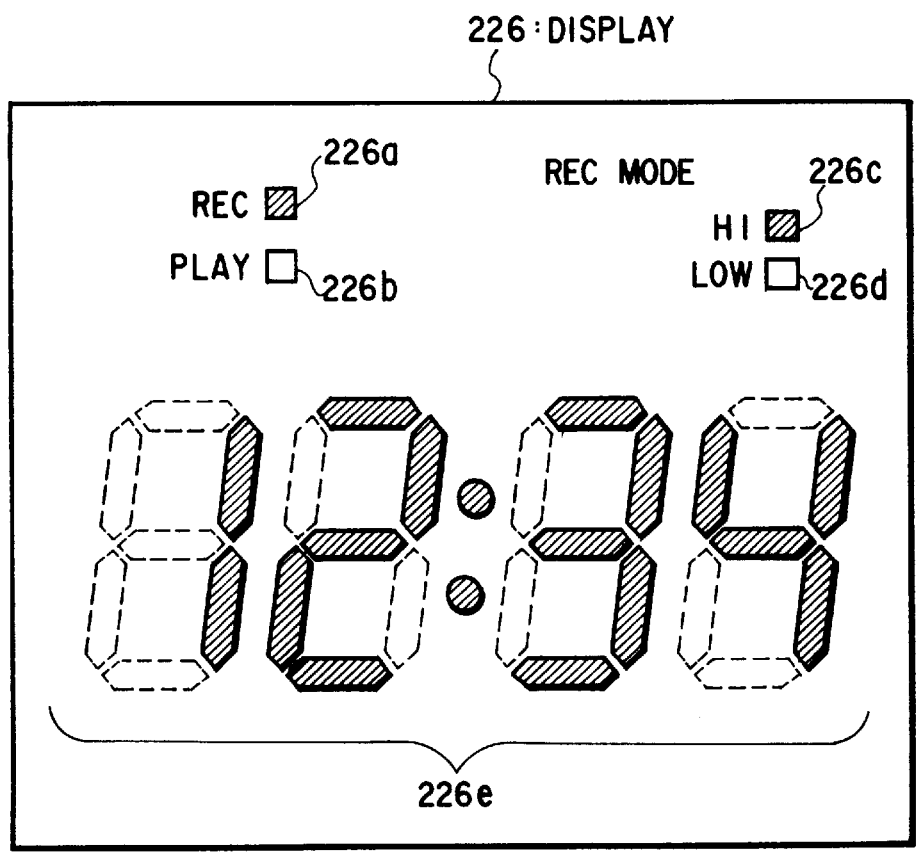
FIG. 11 shows an example of displaying the remainder of the recordable time in the third embodiment.

FIG. 11 shows an example of a display at the time of recording. A REC indicator 226a is lit and a HI indicator 226c indicating that the encoding bit rate is high is lit because the first encoding/decoding circuit 219A is selected. The remainder of the recordable time, 12 minutes 34 seconds in this example, is displayed on a time display section 226e. When the second encocling/decoding circuit 219B is selected, a LOW indicator 226d indicating that the encoding bit rate is low will be lit in place of the HI indicator 226c.

The HI and LOW indications may be automatically switched at regular intervals conjointly with an encoding means selecting operation. Without the use of the encoding mode select button, the remainder of the recordable time in each of the two encoding modes may be displayed simultaneously. Moreover, a single encoding circuit may be used if it permits encoding at different bit rates. Furthermore, although, in FIG. 11, the remaining recordable time (the remaining capacity of the memory) is displayed, the time spent in recording (the used capacity of the memory) may be displayed instead.

The address counter 224 is next incremented by one (step S58) and then step S54 is carried out again. Until a recording stopping operation is performed or the ending address in the voice memory 222 is reached, the recording operation is continued while the address counter is incremented one by one.

Here, the remainder of the recordable time in step S57 can be calculated in accordance with expression (2).

Next, the display operation at the time of playback will be described. The playback operation in the third embodiment is substantially the same as that in the first embodiment except the following.

That is, in the third embodiment, the PLAY indicator 226b is lit, but neither of the HI and LOW indicators 226c and 226d is lit in step S36 of FIG. 6. At this point, the time (12 minutes 34 seconds in FIG. 11) displayed on the time display section 226e indicates the remaining playback time.

According to the third embodiment, the used capacity or remaining capacity of the memory that corresponds to a selected one of multiple encoding means with different encoding bit rates can be displayed correctly.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A voice recording apparatus comprising:
    a variable-length encoder adapted to encode an input voice signal by changing an encoding bit rate in accordance with a state of sounds in an input voice signal, said input voice signal including (i) voiced signals corresponding to voice sounds and (ii) voiceless signals corresponding to other sounds or no sounds in the input voice signal;
    a system controller for recording said input voice signal encoded by said variable-length encoder in a memory having a recordable capacity, and for acquiring information with respect to a remaining recordable time of said memory based on a remaining capacity of said memory and an expected average encoding bit rate of said variable-length encoder;
    wherein the encoding bit rate of said variable-length encoder is changed in accordance with the input voice signal such that the average encoding bit rate is calculated as a function of a relationship between the voiced signals and the voiceless signals in the input voice signal; and
    a display unit for displaying said acquired information.

2. The apparatus according to claim 1, wherein said display unit includes a switch for switching among of said acquired information at predetermined intervals for display.

3. The apparatus according to claim 1, wherein the average encoding bit rate is calculated based on a statistical ratio between the voiced signals and the voiceless signals in the input voice signal, which is obtained when a sentence of Predetermined length is uttered.

4. The apparatus according to claim 1, wherein the average encoding bit rate is calculated and updated based on a number of voiced signal frames and a number of voiceless signal frames in a predetermined number of past frames.

5. A voice recording apparatus comprising:
- a variable-length encoder adapted to encode an input voice signal by changing an encoding bit rate in accordance with a state of sounds in an input voice signal, said input voice signal including (i) voiced signals corresponding to voice sounds and (ii) voiceless signals corresponding to other sounds or no sounds in the input voice signal;
- a system controller for recording said input voice signal encoded by said variable-length encoder in a memory having a recordable capacity, and for acquiring information with respect to a remaining recordable time of said memory by performing one of a first calculation based on a remaining capacity of said memory and an expected average encoding bit rate, a second calculation based on the remaining capacity of said memory and a maximum encoding bit rate of said variable-length encoder, and a third calculation based on the remaining capacity of said memory and a minimum encoding bit rate of said variable-length encoder;
- wherein the encoding bit rate of said variable-length encoder is changed in accordance with the input voice signal such that the average encoding bit rate is calculated as a function of a relationship between the voiced signals and the voiceless signals in the input voice signal; and
- a display unit for displaying said acquired information one of simultaneously and selectively.

6. The apparatus according to claim 5, wherein the average encoding bit rate is calculated based on a statistical ratio between the voiced signals and the voiceless signals in the input voice signal, which is obtained when a sentence of predetermined length is uttered.

7. The apparatus according to claim 5, wherein the average encoding bit rate is calculated and updated based on a number of voiced signal frames and a number of voiceless signal frames in a predetermined number of past frames.

8. The apparatus according to claim 5, wherein said system controller also acquires information with respect to an average remaining time, a maximum remaining time, and a minimum remaining time.

9. The apparatus according to claim 5, wherein said display unit includes a switch for switching among said acquired information at predetermined intervals for display.

10. A voice recording method comprising:
- encoding an input voice signal by changing an encoding bit rate in accordance with a state of sounds in an input voice signal, said input voice signal including (i) voiced signals corresponding to voice sounds and (ii) voiceless signals corresponding to other sounds or no sounds in the input voice signal;
- recording said encoded input voice signal in a memory having a recordable capacity;
- acquiring information with respect to a remaining recordable time of said memory based on a remaining capacity of said memory and an expected average encoding bit rate;
- wherein the encoding bit rate of said variable-length encoder is changed in accordance with the input voice signal such that the average encoding bit rate is calculated as a function of a relationship between the voiced signals and the voiceless signals in the input voice signal; and
- displaying said acquired information.

11. A voice recording method comprising:
- encoding an input voice signal by changing an encoding bit rate in accordance with a state of sounds in an input voice signal, said input voice signal including (i) voiced signals corresponding to voice sounds and (ii) voiceless signals corresponding to other sounds or no sounds in the input voice signal;
- recording said encoded input voice signal in a memory having a recordable capacity;
- acquiring information with respect to a remaining recordable time of said memory by performing one of a first calculation based on a remaining capacity of said memory and an expected average encoding bit rate, a second calculation based on the remaining capacity of said memory and a maximum encoding bit rate, and a third calculation based on the remaining capacity of said memory and a minimum encoding bit rate;
- wherein the encoding bit rate of said variable-length encoder is changed in accordance with the input voice signal such that the average encoding bit rate is calculated as a function of a relationship bet ween the voiced signals and the voiceless signals in the input voice signal; and
- displaying said acquired information.

* * * * *